Aug. 15, 1939.    F. M. REID    2,169,500
TANK VEHICLE
Filed July 18, 1938    2 Sheets-Sheet 1
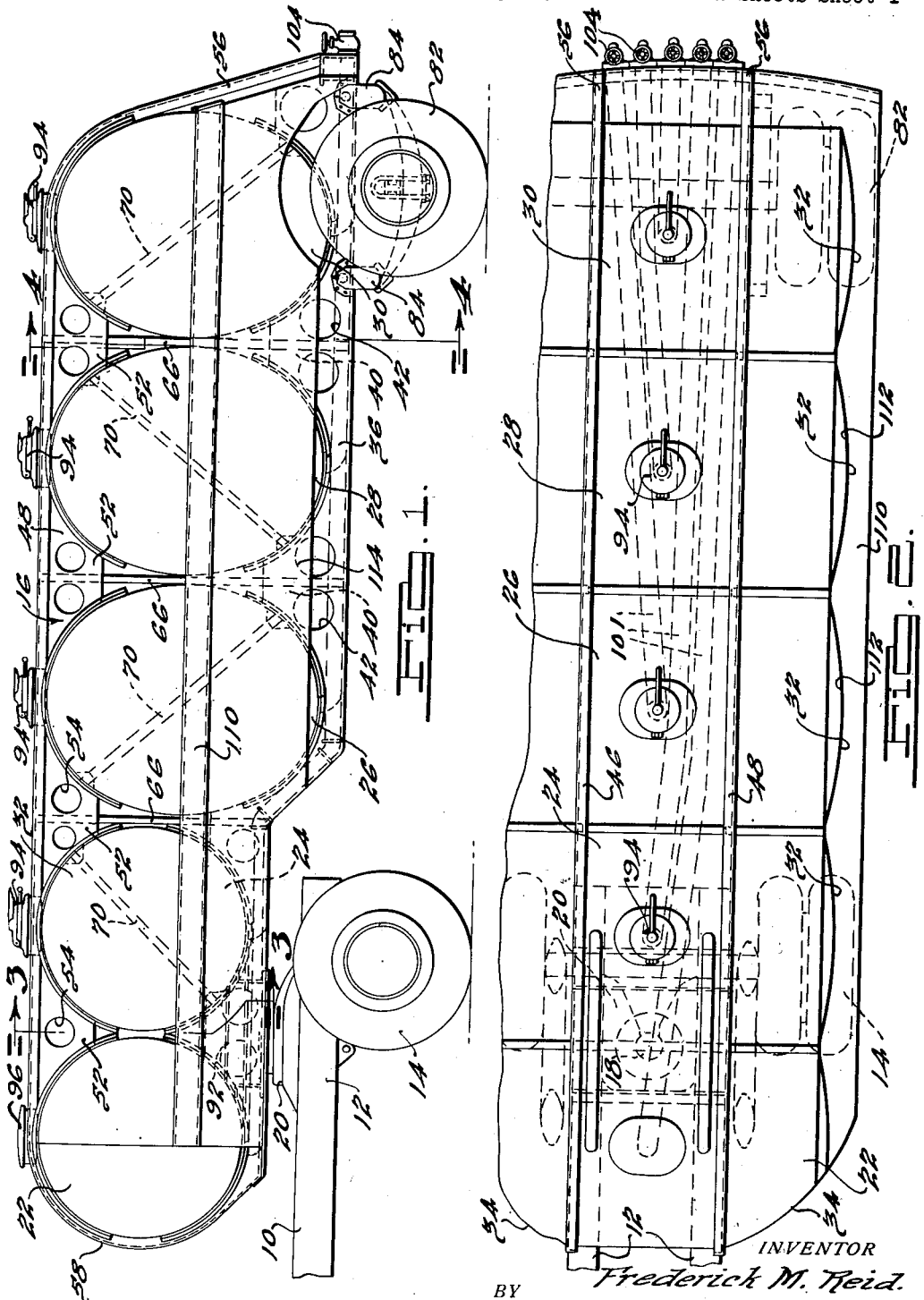
INVENTOR
Frederick M. Reid.
BY
Harness, Dickey & Pierce.
ATTORNEYS.

Aug. 15, 1939.  F. M. REID  2,169,500
TANK VEHICLE
Filed July 18, 1938    2 Sheets-Sheet 2

INVENTOR
Frederick M. Reid.
BY Harness, Dickey & Pierce.
ATTORNEYS.

Patented Aug. 15, 1939

2,169,500

UNITED STATES PATENT OFFICE 2,169,500

TANK VEHICLE

Frederick M. Reid, Detroit, Mich., assignor to Fruehauf Trailer Company, Detroit, Mich., a corporation of Michigan Application July 18, 1938, Serial No. 219,726

11 Claims. (Cl. 280—5)

This invention relates to tank vehicles and particularly relates to semi-trailer tank vehicles.

One of the primary objects of the present invention is to provide improved tank vehicle structures which are light in weight whereby they may carry an increased contents, as compared with prior structures.

Another object of the invention is to provide a tank structure having a plurality of compartments in which the compartments are so constructed and arranged relative to each other that they are not subjected to twisting strains and there is no chance for leakage from one compartment to another.

Another object of the invention is to provide a tank structure having individual tanks in which the tanks have curved walls of smaller radii than prior constructions and therefore may be made of lighter gauge sheet metal.

Another object of the invention is to provide a tank structure in which the tanks forming the receptacles are not stressed for the carrying beam load and are therefore not subjected to twisting strains.

Another object of the invention is to provide an improved tank structure in which the welding for securing the tank receptacles to the frame may be externally effected.

A further object of the invention is to provide an improved structure in which there is no danger of leaks between sections at the point at which the reduced section occurs.

A further object of the invention is to provide a structure having longitudinally extending angle members which serve as the top cord of the frame and also serve as the external bracing means for the tank shell.

Another object of the invention is to provide longitudinally extending bottom angle members which serve to brace the tank shells and also serve as the attaching means for an upper fifth wheel construction and also the attaching means for the rear spring and axle assembly.

Another object of the invention is to provide an improved construction in which the running-boards form a compartment for the hose tube and serve to further stiffen the tank ends.

Other objects of the invention will become apparent from the following specification, the drawings relating thereto, and from the claims hereinafter set forth.

In the drawings in which like numerals are used to designate like parts in the several views throughout:

Figure 1 is a side elevational view of a tank trailer embodying features of the present invention;

Fig. 2 is a fragmentary top-plan view of the structure illustrated in Fig. 1;

Figures 3, 4:
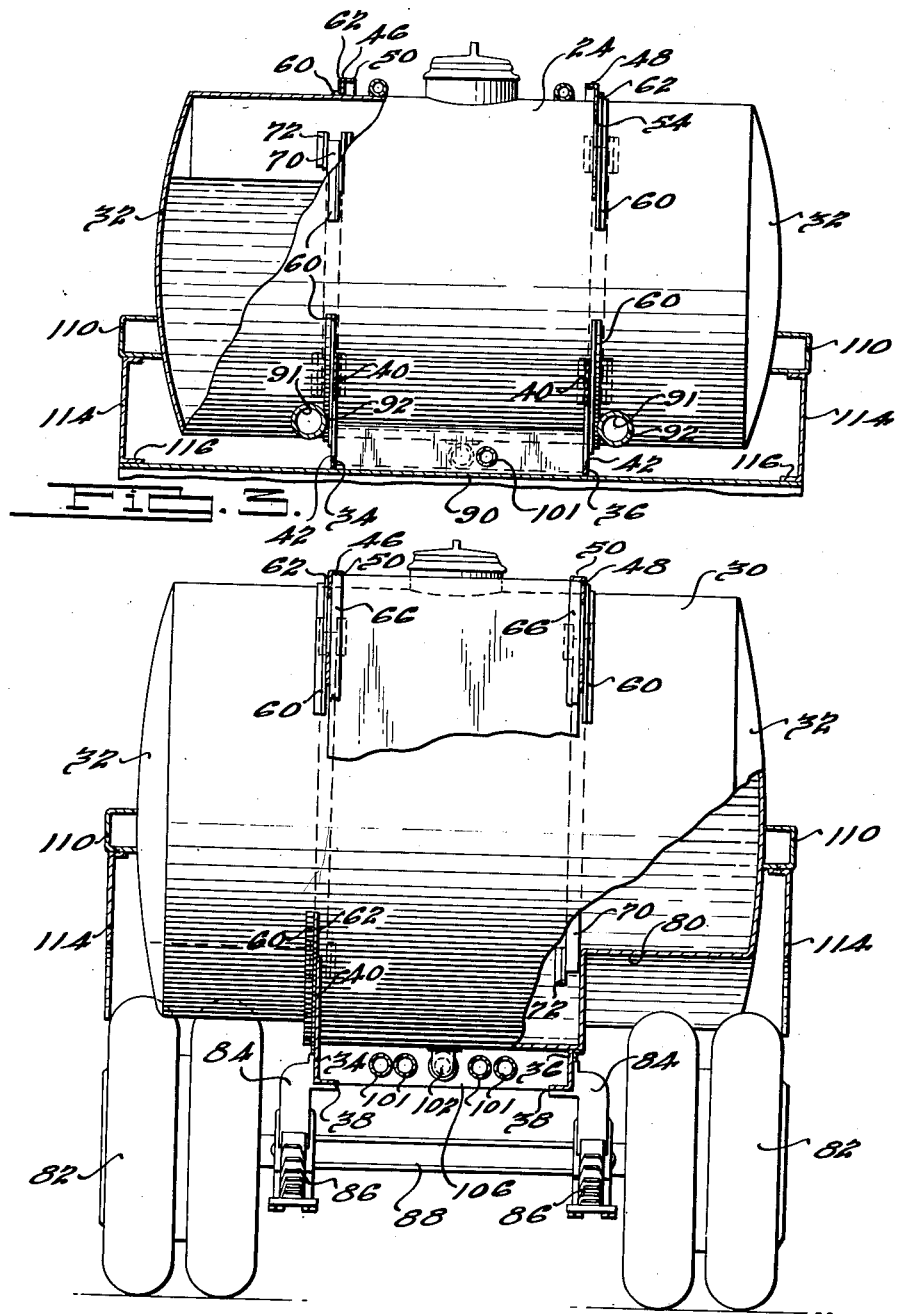
Fig. 3 is a cross-sectional view showing parts in elevation with the parts broken away taken substantially along the line 3—3 of Fig. 1.
Fig. 4 is a view similar to Fig. 3 taken substantially along the line 4—4 of Fig. 1.

In prior tank vehicles of the type to which the present invention is directed the tank receptacles have been constructed and arranged so that they are subjected to twisting stresses which separate adjacent parts of the various compartments so that leakage between the compartments occurs. According to the present invention, a structure is provided in which the individual tanks or drums are so constructed and arranged that they are not stressed by the carrying beam load and are not subjected to twisting strain. There is no leakage therefrom between the individual compartments. Other features of the present invention, which will be described in detail hereinafter, contribute toward the production of an improved and rugged tank vehicle structure.

Referring to the drawings a usual automotive tractor partially indicated at 10 is provided having a rearwardly extending frame 12 with ground wheels 14 connected thereto adjacent the rear end thereof in the usual way. A tank vehicle structure generally indicated at 16 in the form of a semi-trailer has an upwardly offset portion adjacent the front end thereof which is pivotally connected to the tractor 10 by a pivotal connection such as a fifth wheel structure. The fifth wheel structure is preferably of the type disclosed in detail in the patent to Frederick M. Reid No. 1,925,279, issued September 5, 1933; and includes a downwardly directed kingpin member 18 which is secured under the tank 16 adjacent the forward end thereof. The kingpin 18 is adapted to engage a lower fifth wheel member 20, of the structure disclosed in the above mentioned patent, which is suitably secured to the frame 12.

The tank 16 includes a plurality of separate receptacles in the form of independent tanks or drums 22, 24, 26, 28 and 30. The number of such tanks, may, of course, be varied to suit various conditions within the scope of the present invention. The tanks may be made of relatively light gauge sheet metal with end walls 32 disposed along the sides of the vehicle. The tanks 22 and 24 are preferably substantially circular in transverse section; and the tanks 26, 28 and 30 are preferably substantially elliptical in transverse section. The tanks are so arranged that the tops thereof lie in substantially the same plane; and as the two tanks 22 and 24 are of substantially less depth than the remaining tanks, the bottoms of the tanks 22 and 24 are upwardly offset from the bottoms of the remaining tanks. The forwardmost wall of tank 22 is preferably rearwardly and outwardly curved as indicated at 34 so that the forward end of the tank may be brought relatively close to the cab of the tractor 10 while a relatively large degree of pivotal movement is permitted between the tractor and the trailer.

The independent tanks 22 through 30 are transversely mounted, that is they are mounted with their longitudinal axes transversely disposed of the tank vehicle. The tanks are slightly separated from each other and are supported on longitudinally extending beam members 34 and 36. Such beam members extend throughout substantially the entire length of the trailer and have their lower edges flanged inwardly as indicated at 38 throughout their lengths so as to stiffen them. As is evidenced from the cross-sectional shapes of the tanks, such tanks have curved tops and bottoms; and the beams 34 and 36 are curved complementarily in shape so the curvature of the under sides of the tank so that intermediate portions 40 are provided which extend between the adjacent tanks. The beams are also provided with punched out openings 42 therethrough at suitable points so that the weight thereof is considerably reduced.

Longitudinally extending top beam members 46 and 48 are disposed longitudinally of the vehicle and extend over the tops of the tanks 22 through 30. The upper edges of the beams 46 and 48 are flanged inwardly as indicated at 50 so as to strengthen the beams. The beams 46 and 48 are also curved to a curvature complementary to that of the curved tops of the tanks 22 through 30 so that portions 52 are formed which are disposed between the adjacent tanks. Punched out openings 54 are also provided through the beam members 46 and 48 so as to reduce the weight thereof.

The beams 46 and 48 are bent downwardly at the rear ends as indicated at 56 and are fixedly secured to the rear ends of the beam 34 and 36 so that they act as straps to rigidly secure the tanks in position. The forward ends of the beams 46 and 48 are also wrapped around the forward end of the tank 22, as indicated at 58, and extend around the forward end of the tank where they are fixedly secured to the forward ends of the beams 34 and 36 so that the tanks are completely enveloped and are strapped in position.

In order to fixedly secure the tanks to the members 34, 36, 46, and 48, angle members 60 are rolled to curvatures complementary to the curvatures of the rounded tops and bottoms of the tank and are welded to the respective tops and bottoms of the respective tanks. The rolled sections 60 thus provide outwardly disposed flanges 62 to which the curved and intermediate portions of the beams 34, 36, 46 and 48 are welded.

The rolled sections 60 serve to strengthen the tank structures and may be readily welded to the outer surfaces thereof. The flanges 62 provide convenient surfaces to which the beam members may be welded. It is pointed out that such welding may be effected externally of the tank and the depth of the flange 62 permits some latitude in accuracy so that the tanks may be readily fixed in position. The load is thus carried by the longitudinally extending beams and the tanks are not subjected to twisting stresses.

In order to further strengthen the structure, vertically extending struts 66 are placed between adjacent tanks and are secured at their lower and upper ends to the bottom and top beam members respectively. In order to further strengthen the tank structures diagonal struts 70 are disposed within the tanks and are fixed to brackets 72 on the inner walls thereof. The number of such struts may of course be varied, but it is preferable to use a pair of such struts in each of the tanks, that is one at each side thereof, with the possible exception of the forwardmost tank which need not be provided with such reinforcing struts.

The rear tank 30 is of substantially the same shape as the tanks 26 and 28 except that it is stepped inwardly as indicated at 80 in order to accommodate the rear ground wheels 82. The members 34 and 36 serve to mount the rear ground wheels 82 in that suitable brackets 84 are welded to the members 34 and 36 to which suitable shackle connections are fixed for connection to longitudinally extending leaf springs 86. The rear wheel axle 88 may be connected to the leaf springs 86 at substantially their longitudinal center in the usual way.

In order to mount the kingpin 18 adjacent the forward end of the trailer vehicle, a transversely extending plate member 90 is fixed to the longitudinally extending members 34 and 36, and the kingpin 18 may be suitably secured to this plate member so that it projects downwardly therefrom.

While each of the tanks 22, 24, 26, 28 and 30 may be entirely separate from each other, it is preferred that the two foremost tanks 22 and 24 be in communication so that they, in effect, form a single receptacle. Such communication may be effected by providing openings 91 (Fig. 3) through the walls of the tank members 22 and 24 adjacent the bottoms thereof and connecting such openings by means of suitable conduit members 92. With this structure the tanks may be filled to a substantial level and the adjacent curved bottoms of the tanks serve as surge plates to prevent undue splashing of any liquid contained therein.

A conventional inlet 94 may be provided for each of the tanks so that the lids thereof may be removed for filling the tanks. The foremost tank 22 need not be provided with a removable inlet closure but may be merely provided with a cap 96 since the receptacle 22 may be filled through the receptacle 24.

Outlet conduits may be provided for each of the tanks in the form of elongated pipe members 101 which extend from the rear of the tank vehicle to their respective tanks. Each pipe may be communicated with its tank through an opening in the bottom and through an elbow 102. A single separate pipe need not be provided for the receptacle 22 but one pipe may be provided for both receptacle 22 and 24 having branch conduits extending therefrom so that both of these tanks may be emptied. Suitable flow control valves 104 may be provided for each of the outlet pipes 101 in the usual way. In order to support the pipes, transversely extending plate members 106 may be provided at spaced intervals longitudinally of the tank and may be suitably secured to the beam members 34 and 36.

These plate members may have suitable openings therethrough through which the pipes 101 extend and are supported. The pipes may be welded to the plates if desired.

In order to stiffen the ends 32 of the tanks, a structure is provided which also serves as a runway and a storage compartment for hose at each side of the tank. Such a structure includes longitudinally extending plate members 110 which are shaped in the form of a box section so that they are relatively rigid. The inner edges of the members 110 are curved as indicated at 112 to curvatures complementary in shape to the curvatures of the ends 32 so that the inner edges of the structure 110 engage the tank ends throughout the length of the vehicle. These edges 112 may be welded to the tank ends and serve to stiffen the ends. Hose or other materials may be stored within the compartments formed by the structures 110.

Skirting 114 may be provided at each side of the tank longitudinally thereof and may be fixed to the under side of the runways 110. Such skirting may be flanged inwardly as indicated at 116 so as to stiffen the same.

Formal changes may be made in the specific embodiment of the invention described without departing from the spirit and substance of the broad invention the scope of which is commensurate with the appended claims.

What is claimed is:

1. A trailer tank vehicle having a frame and comprising a plurality of individual tanks with the longitudinal axes thereof disposed transversely of the tank vehicle, each of said tanks having the tops and bottoms thereof curved transversely of their respective longitudinal axes, and longitudinally extending, rigid top and bottom members rigidly and permanently interconnected to form a self-sustaining frame structure and securely and permanently attached to the tops and bottoms of said tanks thus forming the longitudinal beam load carrying elements of said frame independent of the tanks.

2. A trailer tank vehicle having a frame and comprising a plurality of individual tanks with the longitudinal axes thereof disposed transversely of the tank vehicle, each of said tanks having the tops and bottoms thereof curved transversely of their respective longitudinal axes, and longitudinally extending, rigid top and bottom members having portions thereof shaped complementary to the curved tops and bottoms of said tanks, said top and bottom members being rigidly and permanently interconnected to form a self-sustaining frame structure and securely and permanently attached to the tops and bottoms of said tanks thus forming the longitudinal beam load carrying elements of said frame independent of the tanks the tops and bottoms of said tanks forming a longitudinal beam load carrying element of said frame.

3. A trailer tank vehicle having a frame and comprising a plurality of individual tanks with the longitudinal axes thereof disposed transversely of the tank vehicle, each of said tanks having the tops and bottoms thereof curved transversely of their respective longitudinal axes, longitudinally extending, rigid top and bottom members having portions thereof complementary in shape to the curved tops and bottoms of said tank, said top and bottom members being rigidly and permanently interconnected to form a self-sustaining frame structure and securely and permanently attached to the tops and bottoms of said tanks thus forming the longitudinal beam load carrying elements of said frame independent of the tanks, and bracing struts connecting said top and bottom members at spaced intervals longitudinally of said vehicle.

4. A trailer tank vehicle having a frame and comprising a plurality of individual tanks with the longitudinal axes thereof disposed transversely of the tank vehicle, each of said tanks having the tops and bottoms thereof curved transversely of their respective longitudinal axes, diagonal struts disposed within said tanks and fixed to the inner walls thereof to thereby strengthen said tanks, and longitudinally extending, rigid top and bottom members having portions thereof complementary in shape to the curved tops and bottoms of said tanks securely attached to said tanks and forming the longitudinal beam load carrying elements of said frame, said diagonal struts being so arranged that they engage their respective tanks adjacent said portions whereby any strains on said struts are transferred directly to said top and bottom members.

5. A trailer tank vehicle having a frame and comprising a plurality of individual tanks with the longitudinal axes thereof disposed transversely of the tank vehicle, each of said tanks having the tops and bottoms thereof curved transversely of their respective longitudinal axes, and longitudinally extending, rigid top and bottom plate members having portions thereof complementary in shape to the curved tops and bottoms of said tanks, said top and bottom members being rigidly and permanently interconnected to form a self-sustaining frame structure and securely and permanently attached to the tops and bottoms of said tanks thus forming the longitudinal beam load carrying elements of said frame independent of the tanks, and vertical struts disposed between said tanks and connected to said top and bottom members.

6. A trailer tank vehicle having a frame and comprising a plurality of individual tanks with the longitudinal axes thereof disposed transversely of the tank vehicle, each of said tanks having the tops and bottoms thereof curved transversely of their respective longitudinal axes, diagonal struts disposed within said tanks and fixed to the inner walls thereof to thereby strengthen said tanks, longitudinally extending, rigid top and bottom plate members having portions thereof complementary in shape to the curved tops and bottoms of said tank and secured thereto forming the longitudinal beam load carrying elements of said frame, said diagonal struts being so arranged that they engage their respective tanks adjacent said portions whereby any strains on said struts are transferred directly to said top and bottom members, and vertical struts disposed between said tanks externally thereof and connected to said top and bottom members.

7. A trailer tank vehicle having a frame and comprising a plurality of individual tanks with the longitudinal axes thereof disposed transversely of the tank vehicle, said tanks having the tops and bottoms thereof curved transversely of their respective longitudinal axes, and longitudinally extending, rigid top and bottom members having portions thereof complementary in shape to the curved tops and bottoms of said tanks and secured to said tanks, said top and bottom members extending around the end tanks and being rigidly and permanently interconnected to form a self-sustaining frame structure and securely and permanently attached to the tops and bottoms of said tanks thus forming the longitudinal beam load carrying elements of said frame independent of the tanks.

8. A trailer tank vehicle comprising a plurality of individual tanks with the longitudinal axes thereof disposed transversely of the tank vehicle, each of said tanks having the tops and bottoms thereof curved transversely of their longitudinal axes, curved angle members having curvatures complementary in shape to the curvatures of the tops and bottoms of said tanks fixed to said tanks, longitudinally extending top and bottom members having portions thereof complementary in shape to the curved tops and bottoms of said tanks secured to said angle members, said longitudinally extending members having their outer edges thereof flanged to thereby stiffen said members.

9. A trailer tank vehicle comprising a plurality of individual tanks having curved ends with the longitudinal axes thereof disposed transversely of the tank vehicle and with the ends thereof disposed along the sides of said tank vehicle, longitudinally extending top and bottom members securely attached to the tops and bottoms of said tanks forming load carrying means, and longitudinally extending side members of box section having curved inner edges complementary to the curvature of the curved ends of said tanks secured to the curved ends to thereby stiffen said ends and form runways along the sides of said vehicle.

10. A tank vehicle having a frame and comprising a plurality of individual drums with the longitudinal axes thereof disposed transversely of the tank vehicle, longitudinally extending, rigid top and bottom members rigidly and permanently interconnected to form a self-sustaining frame structure and securely and permanently attached to the tops and bottoms of said drums thus forming the longitudinal beam load carrying elements of said frame independently of said drums, bottoms of said drums forming the longitudinal beam load carrying elements of said frame, and means independent of said drums rigidly connecting said top and bottom members together to form a rigid frame construction.

11. A trailer tank vehicle comprising a plurality of individual tanks with the longitudinal axes thereof disposed transversely of the tank vehicle, each of said tanks having the tops and bottoms thereof curved transversely of their longitudinal axes, curved reinforcing members having curvatures complementary in shape to the curvatures of the tops and bottoms of said tanks fixed to said tanks, longitudinally extending top and bottom members having portions thereof complementary in shape to the curved tops and bottoms of said tanks secured to said reinforcing members, said longitudinally extending members having their outer edges thereof flanged to thereby stiffen said members.

FREDERICK M. REID.